(No Model.)
C. E. PATRIC.
FERTILIZER DISTRIBUTER.
No. 273,883. Patented Mar. 13, 1883.
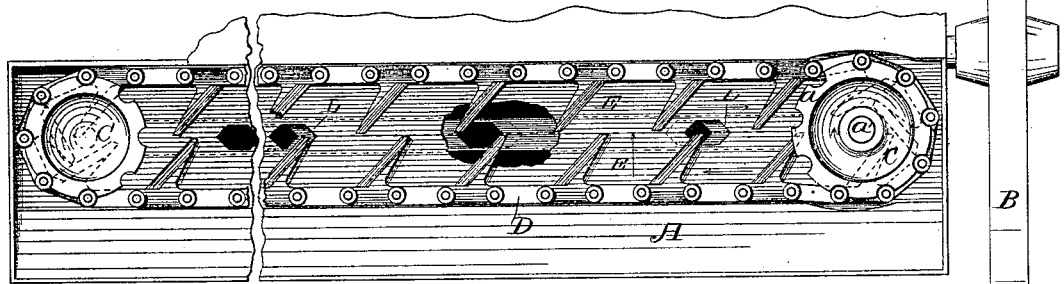
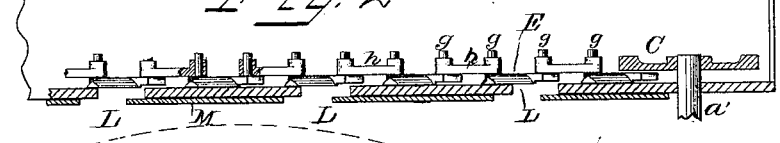
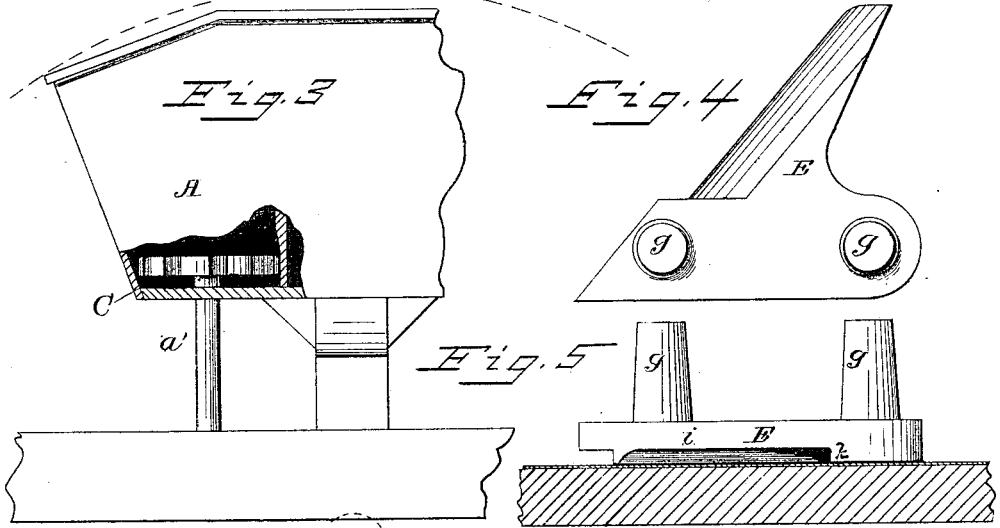
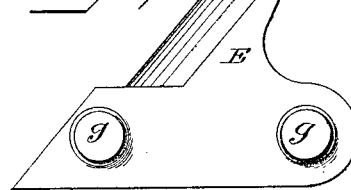
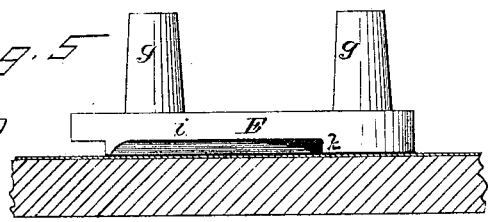
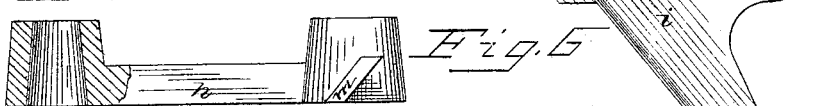
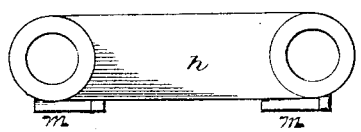
Witnesses:
J. C. Turner
F. A. Fouts
Inventor
C. E. Patric
By his atty R. D. O. Smith

UNITED STATES PATENT OFFICE.

CHARLES E. PATRIC, OF ROCHESTER, NEW YORK.

FERTILIZER-DISTRIBUTER.

SPECIFICATION forming part of Letters Patent No. 273,883, dated March 13, 1883.

Application filed October 11, 1882. (No model.)

*To all whom it may concern:*

Be it known that I, CHARLES E. PATRIC, of Rochester, in the county of Monroe and State of New York, have invented new and useful improvements in Fertilizer-Distributers; and I do hereby declare that the following is a full and accurate description of the same, reference being had to the accompanying drawings, wherein—

Figure 1 is a plan of my improved mechanism. Fig. 2 is a side elevation of the same. Fig. 3 represents an end elevation of the hopper, and the position of the mechanism therein. Figs. 4, 5, 6, 7, and 8 represent in plan and elevation one of the distributers detached.

Fertilizers which are in even a slight degree damp are frequently converted into a sticky dough by agitation and stirring, and therefore I have sought to provide a device which, while it will sweep the whole surface of the hopper-bottom, will avoid disturbing the mass of the fertilizer not immediately in the path of the feed devices. I have discovered that a chain moving within the hopper-bottom will effect the desired object, because its links will draw away any matter with which they come immediately in contact without agitating or displacing any of the mass above its plane of motion. I am aware that chains have been employed to transmit motion to the agitators of fertilizer-distributers; but so far as I am aware such chains were outside the hopper, and the agitators actuated by them were entirely dissimilar in character. It is evident the links of a distributer-chain, working within the hopper and effecting the desired movement of the fertilizer by the direct action of its links or attachments thereto, may be greatly varied in form and structure without departing from the principle of action, and therefore I do not desire to limit myself to the particular structure shown herein. At the same time, for convenience, I will show and describe a structure which I think is in the most desirable form. I have also sought to effect a movement of the feed laterally from the sides of the hopper-bottom toward the center, so that the discharge openings may be located along the median line of said bottom, where the size of said openings may be regulated by movement of a narrow slide.

That others may fully understand my improvement, I will more particularly describe it.

A represents an ordinary fertilizer-hopper mounted upon wheels, one of which is shown at B. The hopper A is usually attached to or mounted together with a seed-hopper upon the same frame and supported by the same wheels; but this does not form a part of my invention. On the bottom, at each end of said hopper, there is a sprocket-wheel, C, and one of them is mounted on a vertical shaft, $a'$, to which motion is communicated from the wheel B by some suitable intermediate mechanism. The other sprocket-wheel C may be mounted on a stud supported by the bottom of the hopper, or in some other convenient way. A chain, D, extends around the sprocket-wheels C within the hopper and along the margins of the hopper-bottom, and is caused to move whenever the sprocket is caused to rotate. The chain D moves in contact with the sides of the hopper, and is thereby kept in line and position, and it is provided at intervals along its length with fingers E, which project laterally toward the median line of the hopper, so that as said chain moves said fingers will be drawn along the hopper-bottom, scraping away any matter which may be thereon. It is more convenient to make the chain D with cast-iron links, and provide each alternate link with a finger E. When made of cast-iron I prefer the form shown, wherein the finger E is provided with a base having an extension longitudinally as to the direction of motion, and near each end of said extension there is a vertical pin-stud, $g$. The intermediate links are simply straight bars $h$, having at each end a hollow or sleeve hub adapted to slip over the pin-stud $g$ of one of the parts E. This constitutes a chain very simple and easy to manufacture or repair. The hub portions of the parts $h$ engage with the sprockets of the wheels C, while the finger-extensions E pass beneath said wheels in passing around the end axles. Between surfaces one of which slides over the other there is always a tendency for matters in contact to work between said surfaces, and thus cause great friction and additional labor. This is particularly the case with sticky, damp matters like the phosphates. To prevent an accumulation of such matter along the edge bearing or traverse of said chain, I place on the outer edge of each link h two obliquely-transverse ribs, m. The edge faces of each of said ribs forms therefore at once a bearing or traveling surface for the chain, and a scraper to remove any foreign matter from said bearing-surface, and the obliquity of the ribs causes the discharge of said scraped-up matter out of the path of the chain. Each finger E has an inclination backward as to the direction of motion, so that the matter encountered by it will receive a lateral as well as a forward movement, and be thereby moved toward the median line of the hopper. I find it preferable also to make the front edge of the finger E oblique with a backward inclination, and also to make its forward edge thin by under-cutting or removing the material from the bottom backward from the edge, as shown at i, Fig. 5. In this way the front or advancing edge is made to rest upon and scrape the hopper-bottom without liability of being raised up therefrom by accumulation of matter beneath the finger. The back edge, k, of the cavity i presents an oblique face parallel with the front scraping-edge, or thereabout, so that any matter which may pass under said scraping-edge into the space i will be caught by the rear face, k, and caused to pass out from beneath the chain and into the path of the next succeeding finger E. The extremities of the fingers E extend just to the median line of the hopper, so that the fingers moving along one side just meet but do not encounter the fingers moving in an opposite direction along the other side, and thereby every portion of the surface of the hopper-bottom is scraped by the moving finger, and the matters resting thereon are moved forward and to the center, when they fall through the openings L, made in said bottom for their discharge. The openings L are elongated in the direction of the hopper's length, and are pointed. The clear opening is made variable by means of a slide, M, having corresponding openings. By moving said slide the openings L and those in the slide are adjusted more or less out of register, so as to regulate the size of or close said openings L entirely. By these means the mass of fertilizer in the hopper is completely undermined and settles uniformly, and no portion of it is subjected to mechanical agitation or stirring, except that part which comes directly in the path of the fingers and is being constantly removed thereby. All lumps are broken up, the flow is regular, and the last particle is swept clean from the hopper-bottom.

Having described my invention, what I claim as new is—

1. A hopper for a fertilizer-distributer, combined with an endless chain entirely within said hopper, and adapted to move longitudinally along the bottom thereof to undermine and carry away to the discharge-openings the lowermost particles of material without disturbing the mass above the plane of motion.

2. A hopper for a fertilizer-distributer, combined with an endless chain provided with fingers and adapted to move along the margin of the hopper-bottom within the hopper, and two sprocket-wheels to hold and propel said chain, the fingers projecting toward the median line, with a backward inclination as to the direction of motion, whereby the entire surface of the hopper-bottom may be scraped and the matter thereon moved forward and inward toward said median line, to be discharged there, as and to the effect set forth.

3. A fertilizer-distributer composed of an endless chain, D, the parts whereof are fingers E, having thin edges in advance and cavities i beneath, behind said advance edge, and two stud-pins, g g, combined with the link-pieces h, provided at each end with a sleeve-hub fitted to engage one of the pins g, as set forth.

4. A fertilizer-distributer chain, D, the links whereof are provided on their outer edges with the oblique scraping-ribs m m, substantially as and for the purpose shown.

CHARLES E. PATRIC.

Witnesses:
B. KEELER,
H. S. FAIRCHILD.